(12) United States Patent
Völbel et al.

(10) Patent No.: US 9,487,197 B2
(45) Date of Patent: Nov. 8, 2016

(54) MULTI-STAGE SWITCHABLE PILOT-CONTROLLED VALVE ARRANGEMENT

(75) Inventors: Heinz Völbel, München (DE); Steffen Krasselt, München (DE); Thomas Garten, München (DE)

(73) Assignee: KNORR-BREMSE SYSTME FUR SCHIENENFAHRZEUGE GMBH, Munich (DE)

( * ) Notice: Subject to any disclaimer, the term of this patent is extended or adjusted under 35 U.S.C. 154(b) by 895 days.

(21) Appl. No.: 13/510,371

(22) PCT Filed: Nov. 16, 2010

(86) PCT No.: PCT/EP2010/067544
§ 371 (c)(1),
(2), (4) Date: Aug. 14, 2012

(87) PCT Pub. No.: WO2011/061171
PCT Pub. Date: May 26, 2011

(65) Prior Publication Data
US 2012/0298892 A1    Nov. 29, 2012

(30) Foreign Application Priority Data
Nov. 18, 2009  (DE) .................. 10 2009 053 814

(51) Int. Cl.
| | |
|---|---|
| *B60T 8/34* | (2006.01) |
| *B60T 8/50* | (2006.01) |
| *B60T 15/54* | (2006.01) |
| *F16K 31/122* | (2006.01) |

(52) U.S. Cl.
CPC .............. *B60T 8/342* (2013.01); *B60T 8/5018* (2013.01); *B60T 15/54* (2013.01); *F16K 31/1225* (2013.01)

(58) Field of Classification Search
CPC ........... F16K 31/1221; F16K 31/1225; B60T 8/342; B60T 8/5018; B60T 15/54
USPC ............ 251/62, 63, 63.4, 63.5, 63.6; 91/461
See application file for complete search history.

(56) References Cited

U.S. PATENT DOCUMENTS 594,228 A * 11/1897 Winters .................. B60T 15/54
303/77
4,296,679 A * 10/1981 Mattsson ......................... 92/52
(Continued)

FOREIGN PATENT DOCUMENTS

| DE | 715272 | 9/1942 |
|---|---|---|
| DE | 4023845 C1 | 4/1992 |

(Continued)

OTHER PUBLICATIONS

German Office Action of Application No. 10 2009 053 814.3, Jun. 15, 2012
(Continued)

*Primary Examiner* — Kevin Murphy
*Assistant Examiner* — Jonathan Waddy
(74) *Attorney, Agent, or Firm* — Barnes & Thornburg LLP

(57) ABSTRACT

A pilot-controlled valve arrangement having at least one valve mechanism mounted in a valve housing for multi-stage switching of a compressed air flow between a feed pressure connection and a working line connection wherein a throttled compressed air flow can be switched in at least one switching stage by a throttle, wherein the pneumatic pilot control has a first control piston mounted in a first control chamber implemented in the valve housing and having a coaxial recess for forming a second control chamber in which a second control piston is mounted, so that an additive control pressure application to the control chambers generates a telescope-like deployment of a ram extending from the second control piston for generating a multi-stage switching stroke for the valve mechanism, in order to implement the throttled compressed air flow in at least one switching stage of the valve mechanism present between the closed and the open valve setting.

9 Claims, 1 Drawing Sheet

(56) References Cited

U.S. PATENT DOCUMENTS

| | | | | |
|---|---|---|---|---|
| 4,460,324 | A | * | 7/1984 | Van Appledorn ............. 425/166 |
| 4,585,207 | A | * | 4/1986 | Shelton ........................... 251/62 |
| 4,759,477 | A | * | 7/1988 | Gelinas .................. B05C 11/00 222/504 |
| 5,669,265 | A | * | 9/1997 | Adler ..................... F16H 61/30 251/62 |
| 6,047,730 | A | * | 4/2000 | Coura ..................... F16K 1/446 137/613 |
| 6,244,562 | B1 | * | 6/2001 | Ejiri ............................. 251/63.6 |
| 7,340,939 | B2 | * | 3/2008 | Jansen ......................... 251/63.4 |
| 8,678,342 | B2 | * | 3/2014 | Sakai .................. F16K 31/1225 251/186 |
| 2004/0007682 | A1 | * | 1/2004 | Kajitani ....................... 251/63.6 |
| 2008/0099703 | A1 | * | 5/2008 | Franconi ......................... 251/62 |

FOREIGN PATENT DOCUMENTS

| | | |
|---|---|---|
| DE | 42 30 875 | 3/1994 |
| DE | 4404358 A1 | 8/1995 |
| EP | 0845398 A2 | 6/1998 |
| EP | 1084924 A2 | 3/2001 |
| EP | 1860359 A1 | 11/2007 |
| EP | 2799722 A1 * | 11/2014 |
| GB | 2 365 528 | 2/2002 |
| WO | 00/60322 | 10/2000 |
| WO | 00/76828 | 12/2000 |
| WO | 01/81888 | 11/2001 |

OTHER PUBLICATIONS

Notification Concerning Transmittal of International Preliminary Report on Patentability and Written Opinion of the International Search Authority for International Patent Application No. PCT/EP2010/063488, dated Sep. 14, 2010.
English Translation of Notification Concerning Transmittal of International Preliminary Report on Patentability and Written Opinion of the International Search Authority for International Patent Application No. PCT/EP2010/063488, dated Sep. 14, 2010.
Search Report for International Patent Application No. PCT/EP2010/067544; Jan. 31, 2011.

* cited by examiner

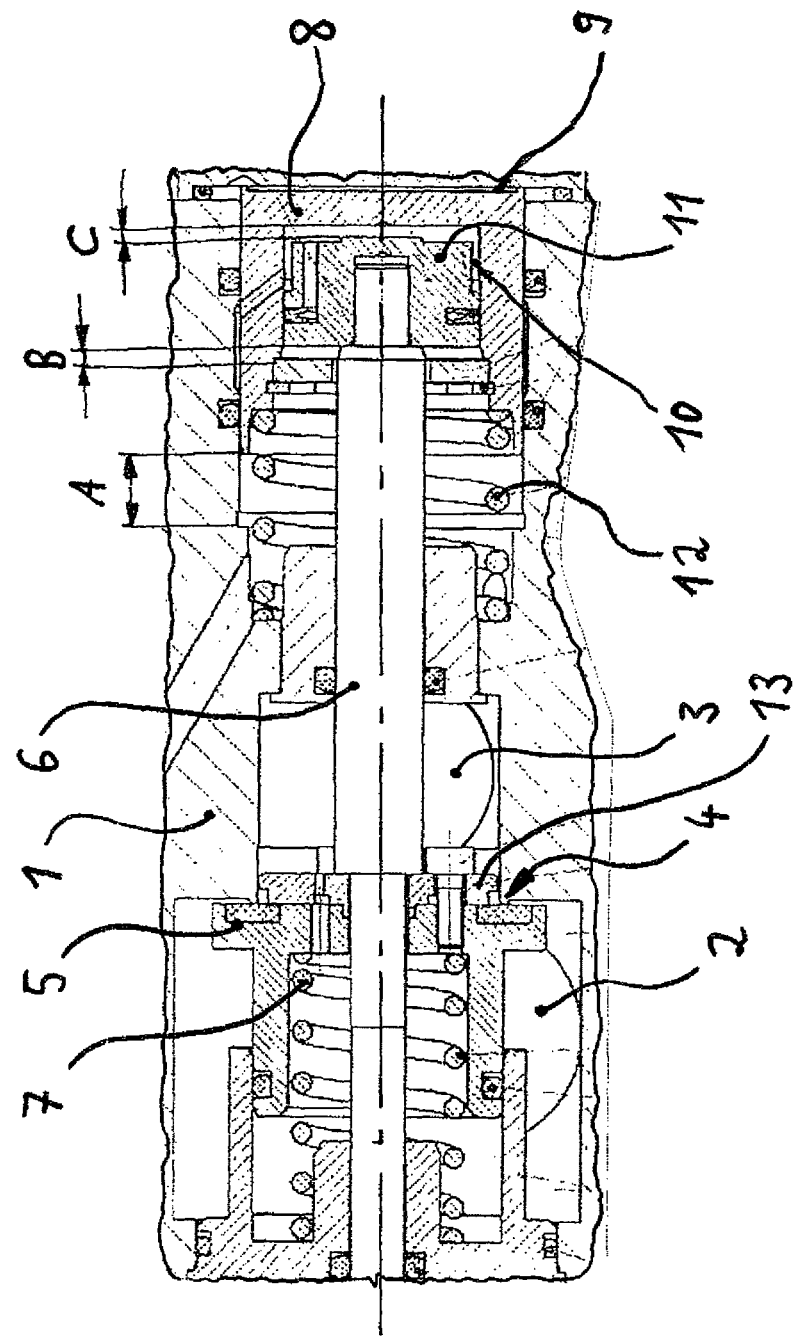

MULTI-STAGE SWITCHABLE PILOT-CONTROLLED VALVE ARRANGEMENT

PRIORITY CLAIM

This patent application is a U.S. National Phase of International Patent Application No. PCT/EP2010/067544, filed 16 Nov. 2010, which claims priority to German Patent Application No. 10 2009 053 814.3, filed 18 Nov. 2009, the disclosures of which are incorporated herein by reference in their entirety.

FIELD

The presently disclosed embodiments relate to a pilot-controlled valve arrangement having at least one valve mechanism, which is accommodated in a valve housing, for multi-stage switching of a compressed air flow between a feed pressure port and a working line port, wherein, in at least one switching stage, a throttled compressed air flow can be generated by throttling means.

The field of use of the presently disclosed embodiments extends primarily to rail vehicle technology. In pneumatic brake systems, a multiplicity of different multi-way valves are used for controlling the brake pressure and auxiliary pressures involved therein. Aside from simple switching valves with 2/2 valve function, more complex multi-way valves are also required for example for aerating and deaerating compressed air assemblies. The presently disclosed embodiments are applicable in particular to shut-off valves of pneumatic brake systems.

BACKGROUND

According to the generally known prior art, to realize shut-off modules of pneumatic brake systems, valve arrangements exist that can be switched in multi-stage fashion, for example, to permit a throttled compressed air flow. For this purpose, it is conventionally known for two 2/2 directional control valves, depending on switching stage, to be connected in parallel and actuated separately, wherein one of the two 2/2 directional control valves is connected in series with a throttle in order to realize the switching stage of a throttled compressed air flow. Such a valve arrangement is of extremely large construction, and the assembly outlay for the individual components, in particular the piping thereof, is extremely high.

SUMMARY

Therefore presently disclosed embodiments provide a multi-stage switchable valve arrangement with a throttle stage, which valve arrangement is constructed from simple components and is of particularly compact construction.

BRIEF DESCRIPTION OF THE FIGURES

Features of the disclosed embodiments will be presented in more detail below in conjunction with the description of the disclosed embodiments based on the single FIGURE.

The FIGURE shows a longitudinal section through a multi-stage switchable pilot-controlled valve arrangement which is designed as a seat valve.

DETAILED DESCRIPTION

Disclosed embodiments provide a pneumatic pilot controller of a multi-stage switchable valve arrangement comprises a first control piston which is accommodated in a first control chamber formed in the valve housing and which comprises a coaxial recess for forming a second control chamber in which a second control piston is accommodated, such that an additive action of control pressure on the control chambers generates a telescopic extension of a plunger, which extends from the second control piston, for generating a multi-stage switching stroke for the valve mechanism in order to realize the throttled compressed air flow in at least one switching stage, which lies between the closed and open valve positions, of the valve mechanism.

With the solution according to the disclosed embodiments, the switching stage for the throttled compressed air flow is thus advantageously attained by virtue of the valve mechanism targetedly assuming an intermediate position in which a flow cross section is provided which is smaller than the fully open valve position. For such throttling of the compressed air flow, there is therefore no need for a separate throttle or aperture which—as in the prior art—is combined with a conventional switching valve. As a result of the functionally integrated design of the valve arrangement according to the disclosed embodiments, installation space is utilized efficiently, such that the solution according to the disclosed embodiments can be realized in an extremely compact construction. The linking of all the valve positions, specifically the closed valve position, at least one throttled valve position and the open valve position, by means of one and the same valve mechanism increases the reliability of the valve arrangement, because it is no longer necessary for individual valves with throttles to be connected to one another by piping. Appliance reliability is thus increased in relation to the solutions from the prior art.

The valve mechanism actuated by pneumatic pilot control is, according to one measure which improves the disclosed embodiments, formed in the manner of a seat valve comprising an annular valve seat which is fixed with respect to the housing and which has an associated closure element with elastomer body, which closure element actuates the pneumatic pilot controller via the abovementioned plunger. Such a seat valve has proven to be particularly robust for the application according to the disclosed embodiments, and the switching stages with the throttled compressed air flow can, with a seat valve, be realized with a small switching stroke, such that precise throttling by throttling means in a narrow tolerance range can be realized.

The seat valve may have a normally closed valve function by virtue of a valve restoring spring integrated in the valve housing holding the closure element in the closed position when the pilot controller is unpressurized. In the event of a failure of the pilot controller; the valve arrangement would thus automatically assume the closed switching position, such that a pressure medium flow from the feed pressure port to the working pressure port is no longer possible.

With the valve arrangement according to the disclosed embodiments, it is possible to realize at least one switching stage with a throttled compressed air flow, but at most it is possible to realize two such switching stages. A first throttled compressed air flow of a first switching stage can be realized by virtue of only the second control piston of the pilot control being acted on, that is to say by virtue of exclusively the second control piston being acted on with control pressure. In contrast, in the first switching stage, the first control piston is not acted on with control pressure.

For a second switching stage which permits a further throttled compressed air flow which, depending on the switching stroke, is greater or lesser than the abovementioned first throttled compressed air flow, only the first control piston of the pilot controller is acted on with control pressure, whereas the second control piston is not acted on with a control pressure. In the second switching stage, too, the closure element lifts up only slightly from the associated valve seat in order to provide, for the compressed air flow, a flow cross section smaller than the fully open valve position.

The fully open valve position which permits an unthrottled compressed air flow may be attained in a third switching stage in which both control pistons of the pilot controller are acted on jointly with control pressure. Here, the switching stroke of the first control piston is added to the switching stroke of the second control piston, such that the plunger performs its maximum stroke in order to move the valve mechanism into the fully open valve position.

According to another aspect of the disclosed embodiments, it is proposed that both the control piston and also the respective switching strokes thereof be dimensioned differently in order, in accordance with the control pressure and in particular the spring forces which act in the opposite direction thereto on the control piston, to attain a reliably switching valve characteristic, without a large structural space being taken up for this purpose. Accordingly, the switching stroke of the first control piston of larger diameter should be dimensioned to be greater than the switching stroke of the second control piston of smaller diameter, which second control piston is, according to the disclosed embodiments, inserted into the first control piston and may therefore, owing to its construction, have smaller geometric dimensions than the first control piston. With the smaller switching stroke of the second control piston, it is possible to attain a correspondingly intense throttling action by means of the valve mechanism. The design of the pneumatic pilot controller according to the disclosed embodiments thus promotes the high degree of throttling that can be attained with the valve arrangement.

According to another measure which improves the disclosed embodiments, each of the two control pistons is assigned a restoring spring. It is proposed that the second control piston of smaller diameter can be acted on with control pressure via the plunger counter to the force of the valve restoring spring. Therefore, no separate spring element need be provided for the restoring spring of the second control piston. The valve restoring spring performs this task in a functionally integrated manner.

By contrast, the first control piston of larger diameter should be assigned a separate piston restoring spring. It is proposed that the piston restoring spring be accommodated in the valve housing between the region of the valve mechanism and the pilot controller. The piston restoring spring is supported at one side against the valve housing and at the other side against the base of the first control piston, which is acted on on the opposite side with control pressure. In this respect, the piston restoring spring is accommodated in a particularly space-saving manner.

To implement more than three valve positions, specifically the closed valve position, more than one throttled valve position and the open valve position, the valve arrangement may optionally be equipped with a further switching stroke. The further switching stroke is formed by shoulders, at the piston side and/or at the housing side, between the first control piston and the second control piston. Here, the further switching stroke is smaller than the switching stroke of the first control piston. If, however, the further switching stroke is larger than the switching stroke of the first control piston, then according to a further embodiment of the valve mechanism, the switching stage with a further (second) throttled compressed air flow would be eliminated, because owing to the other construction parameters, the control pressure of the second control piston would have priority.

According to the FIGURE, a valve housing 1—illustrated here merely as a detail in the region of the valve mechanism—has a feed pressure port 2 and a working port 3. The valve mechanism may have a normally closed 2/2 valve function which is realized by means of a seat valve. The seat valve comprises a valve seat 4 which may be fixed with respect to the housing and which, with an associated closure element 5, can be moved, under the control of a pneumatic pilot controller, by means of a coaxially running and axially movable plunger 6 from the fully closed valve position illustrated here into the open valve position via a throttled valve intermediate position. A valve restoring spring 7 likewise integrated in the valve housing 1 may hold the closure element 5 of the seat valve in the closed switching position when the pilot controller is unpressurized.

The pneumatic pilot controller is composed of a first control piston 8 which is accommodated in a first control chamber 9 formed in the valve housing 1 and which contains a coaxial recess for forming a second control chamber 10. Into the second control chamber 10 there is inserted a second control piston 11. The plunger 6 runs, proceeding from the second control piston 11, in the direction of the valve mechanism.

An additive action of control pressure on both control chambers 9 and 10 leads to a telescopic extension of the control pistons 8 and 11, whereby a multi-stage switching stroke for the valve mechanism can be generated. By means of the multi-stage switching stroke, the switching stage situated between the closed and open valve positions can be assumed for a throttled compressed-air flow.

For the throttled compressed air flow, in the first switching stage, exclusively the second control piston 11 of the pilot controller is acted on with control pressure. In this exemplary embodiment, a further throttled compressed-air flow which has a larger flow cross section than the abovementioned first throttled compressed-air flow is realized in that, in a second switching stage, exclusively the first control piston 8 is acted on with control pressure. The unthrottled compressed-air flow, which corresponds to the fully open valve position, is attained by means of a third switching stage in which both control pistons 8 and 11 are acted on with control pressure. This switching logic corresponds to the following matrix:

| Switching stage | 1st control piston acted on | 2nd control piston acted on | Switching stroke |
| --- | --- | --- | --- |
| 0 | — | — | O |
| 1 | — | x | B |
| 2 | x | — | A – C |
| 3 | x | x | A + B |

In this exemplary embodiment, the switching stroke A of the first control piston 8 of larger diameter is larger than the switching stroke B of the second control piston 11 of smaller diameter. If only control piston 8 is acted on with pressure, then a further switching stroke A minus C is generated. The fourth and largest valve stroke is generated optionally if both control pistons are acted on.

The restoring of the two control pistons 8 and 11 when the pilot controller is unpressurized is realized by means of spring forces. For this purpose, the second control piston 11 of smaller diameter is acted on by the valve restoring spring 7 via the plunger 6. By contrast, the first control piston 8 of larger diameter is acted on, counter to the direction of action of the control pressure, by a piston restoring spring 12 assigned to the first control piston. The piston restoring spring 12 is arranged in a space-saving manner in the valve housing 1 between the region of the valve mechanism and the pilot controller. As throttle means within the context of the disclosed embodiments, a throttle plate 13 is arranged in the region of the closure element 5.

The disclosed embodiments are not restricted to the exemplary embodiment described above. In fact, modifications thereof are also conceivable which are also encompassed by the scope of protection of the subsequent claims. For example, it is also possible by means of the solution principle according to the disclosed embodiments to realize more than three valve positions or the maximum of four valve positions proposed here. The valve mechanism may also, instead of a seat valve mechanism, be formed as a slide valve mechanism.

LIST OF REFERENCE SYMBOLS

1 Valve housing
2 Feed pressure port
3 Working line port
4 Valve seat
5 Closure element
6 Plunger
7 Valve restoring spring
8 First control piston
9 First control chamber
10 Second control chamber
11 Second control piston
12 Piston restoring spring
13 Throttle element
A Switching stroke of the first control piston
B Switching stroke of the second control piston
C Further switching stroke

The invention claimed is:

1. A pilot-controlled valve arrangement having at least one valve mechanism accommodated in a valve housing for multi-stage switching of a compressed air flow between a feed pressure port and a working line port, the arrangement comprising:
at least one switching stage, wherein a throttled compressed air flow is generated,
a pneumatic pilot controller that comprises a first control piston accommodated in a first control chamber formed in the valve housing and which comprises a coaxial recess for forming a second control chamber in which a second control piston is accommodated, such that an additive action of control pressure on the first and second control chambers generates a telescopic extension of a plunger, which extends from the second control piston to generate a multi-stage switching stroke for the valve mechanism to realize the throttled compressed air flow in the at least one switching stage, which lies between the closed and open valve positions of the valve mechanism,
wherein for a first throttled compressed air flow, in a first switching stage, the pressure causes movement of the second control piston to a fully extended position relative to the first control piston, and the first control piston remains in a stationary position relative to the first control chamber, the first control piston extends counter to a direction of action of the control pressure by a piston restoring spring so that the first control piston does not contribute to first switching stage.

2. The pilot-controlled valve arrangement of claim 1, wherein the valve mechanism is a seat valve comprising a valve seat fixed with respect to the housing and which has an associated closure element which is actuated by the pneumatic pilot controller via the plunger.

3. The pilot-controlled valve arrangement of claim 2, further comprising a valve restoring spring integrated in the valve housing that holds the closure element of the seat valve in the closed position when the pilot controller is unpressurized.

4. The pilot-controlled valve arrangement of claim 1, wherein for a further throttled compressed air flow, in a second switching stage, control pressure acts on the first control piston and not the second control piston of the pilot controller.

5. The pilot-controlled valve arrangement of claim 1, wherein for an unthrottled compressed air flow, in a third switching stage, both the first and second control pistons of the pilot controller are acted on with control pressure.

6. The pilot-controlled valve arrangement of claim 1, wherein a switching stroke of the first control piston is larger than a switching stroke of the second control piston, wherein the first control piston has a larger diameter than the second control piston.

7. The pilot-controlled valve arrangement of claim 3, wherein the second control piston can be acted on with control pressure counter to the force of the valve restoring spring, wherein the second control piston has a smaller diameter than the first control piston.

8. The pilot-controlled valve arrangement of claim 1, wherein the first control piston, which has a larger diameter than the second control piston, can be acted on with control pressure counter to the force of the piston restoring spring which is arranged in the valve housing between the region of the valve mechanism and the pilot controller and which abuts against a base of the first control piston.

9. The pilot-controlled valve arrangement of claim 1, wherein an axial spacing between the first control piston and the second control piston forms a further switching stroke.

* * * * *